United States Patent [19]
Morimoto

[11] Patent Number: 6,091,693
[45] Date of Patent: Jul. 18, 2000

[54] OPTICAL RECORDING MEDIUM AND OPTICAL INFORMATION STORAGE UNIT

[75] Inventor: Yasuaki Morimoto, Kawasaki, Japan

[73] Assignee: Fujitsu Limited, Kawasaki, Japan

[21] Appl. No.: 09/107,855

[22] Filed: Jun. 30, 1998

[51] Int. Cl.[7] ........................................ G11B 11/10
[52] U.S. Cl. .................. 369/112; 369/13; 369/44.13; 369/44.26; 369/275.1; 369/275.4; 369/277
[58] Field of Search ................... 369/44.13, 13, 369/275.4, 44.26, 275.1, 44.29, 44.23, 277

[56] References Cited

U.S. PATENT DOCUMENTS

| | | | |
|---|---|---|---|
| 3,963,862 | 6/1976 | Bouwhuis | 369/44.13 |
| 4,587,533 | 5/1986 | Nakane et al. | 369/275.1 |
| 4,852,076 | 7/1989 | Ohta et al. | 369/277 |
| 4,952,787 | 8/1990 | Nakamura et al. | 369/275.1 |
| 5,537,373 | 7/1996 | Horikiri | 369/44.13 |
| 5,553,051 | 9/1996 | Sugiyama et al. | 369/275.4 |
| 5,799,007 | 8/1998 | Lee et al. | 369/275.4 |
| 5,831,942 | 11/1998 | Morimoto et al. | 369/13 |
| 5,862,123 | 1/1999 | Horie et al. | 369/275.4 |

FOREIGN PATENT DOCUMENTS

| | | |
|---|---|---|
| 4-291045 | 10/1992 | Japan . |
| 5-314538 | 11/1993 | Japan . |
| 7-311947 | 11/1995 | Japan . |
| 8-7357 | 1/1996 | Japan . |
| 8-83426 | 3/1996 | Japan . |
| 9-115185 | 5/1997 | Japan . |
| 9-128825 | 5/1997 | Japan . |
| 9-161347 | 6/1997 | Japan . |
| 9-204700 | 8/1997 | Japan . |
| 9-212870 | 8/1997 | Japan . |
| 9-212928 | 8/1997 | Japan . |
| 10-64133 | 3/1998 | Japan . |

OTHER PUBLICATIONS

High Density Land & Groove Recording with Modified Optics and PA–MFM Recording; N. Aoyama, Y. Morimoto and T. Miyahara; *The Magnetics Society of Japan*; pp. 233–238; 1996.

*Primary Examiner*—Ali Neyzari
*Assistant Examiner*—Kim-Kwok Chu
*Attorney, Agent, or Firm*—Greer, Burns & Crain, Ltd.

[57] ABSTRACT

An optical recording medium is made up of an optically transparent substrate having a groove and a land which have approximately the same width and are formed spirally or concentrically, where the groove has an optical depth described by $(1/8+(1/2)n)\lambda$, n is 0 or a positive integer and $\lambda$ is a wavelength of a laser. At least one of two walls defining the groove is zigzag shaped and the groove is capable of having digital information recorded thereon.

8 Claims, 5 Drawing Sheets

APPROXIMATELY 1/8 λ

SUBSTRATE CROSS SECTION

OPTICAL RECORDING MEDIUM AND OPTICAL INFORMATION STORAGE UNIT

BACKGROUND OF THE INVENTION

The present invention generally relates to optical recording mediums and optical information storage units, and more particularly to an optical recording medium and to an optical information storage unit which records and reproduces a magneto-optic signal to and/or from a groove and a land of the optical recording medium.

In this specification, an "information storage unit" refers to an apparatus which records information on and/or reproduces information from a recording medium.

Presently, optical recording mediums are popularly used as recording mediums capable of enabling reproduction of audio signals and image signals therefrom. Particularly, active research and development are made with respect to magneto-optic recording mediums and phase change recording mediums, as rewritable high-density recording mediums.

Two techniques are conceivable in order to improve the recording density of the optical recording medium which records information spirally or concentrically, namely, reducing the track pitch and improving the linear recording density. In either case, the recording density can be improved by shortening the output wavelength of a semiconductor laser which is used for the recording and reproduction. However, a green or blue semiconductor laser which produces an output having a short wavelength and can continuously oscillate with stability at room temperature is unlikely to be put on the market at a low cost for still some considerable time. Under such circumstances, there are demands to realize a method of greatly improving the recording density by using the laser which produces an output having the presently available wavelength, such as a magnetic super resolution (MSR) proposed for the magneto-optic recording medium.

In the case of a RAM medium such as the magneto-optic recording medium, light having the same wavelength is used both at the time of recording information and at the time of reproducing information. On the other hand, in the case of a ROM medium which is prerecorded with information, phase pits are formed using a gas laser or the like which produces an output having a short wavelength. Hence, the reproducing conditions are the same for the RAM medium and the ROM medium, but the RAM medium is disadvantageous compared to the ROM medium from the point of view of recording the information with a high density, because the recording of the RAM medium requires a light source which will only be available in the future. For this reason, in the DVD standard to which much attention is drawn as a next-generation video recording medium for home use, no proposal has yet been made which would support the recording capacity of the ROM medium on the RAM medium having the same medium size as the ROM medium.

If the same linear recording density and the same track pitch are used, it is possible to simply double the recording density by recording the information on both the land and the groove as compared to the case where the information is recorded only on one of the land and the groove. Hence, the method of recording the information on both the land and the groove is an extremely important method from the point of view of developing a high-density recording medium. It has been reported for the magneto-optic recording medium that the MSR described above can not only improve the linear recording density but also reduce crosstalk between the tracks, and various studies are being made on the possibility of applying the MSR to the information recording on both the land and the groove. However, the condition for realizing the MSR is complicated in that, for example, the reproducing laser power depends upon the linear velocity, a reproducing magnetic field is required in some cases, and at least three magnetic layers are required in some cases. Therefore, the MSR is uncertain as to the stability, and the realization is likely to increase the cost of the apparatus.

When the track pitch is reduced, the crosstalk caused by the mixing of a data signal from the adjacent region into the output signal becomes a problem. According to the conventional method which records the information on the land or records the information on the groove, the groove exists between two adjacent recorded lands or, the land exists between two adjacent recorded grooves. As a result, the adjacent regions recorded with the information are separated by a groove or a land, thereby suppressing the crosstalk. However, when recording the information on both the land and the groove, the regions recorded with the information are adjacent to each other, and the effect of the crosstalk on the reproducing characteristic is extremely large. Japanese Laid-Open Patent Application No.8-7353 proposes selection of the depth of the groove so as to reduce the crosstalk from the land or the groove. According to this proposed method, in a case where the wavelength of the light is 680 nm, the numerical aperture of an objective lens used is 0.55 and the widths of the land and the groove are 0.7 $\mu$m, the crosstalk is reduced by setting the depth of the groove to approximately ⅙ of the wavelength.

But even if the spot size of the light irradiated on the magneto-optic recording medium is the same, as the track pitch becomes narrower, there was a problem in that the crosstalk cannot be reduced sufficiently in the case of a groove having the depth on the order of approximately ⅙ the wavelength. In addition, compared to the normal case where the depth of the groove of the magneto-optic recording medium is ⅛ the wavelength, there also were problems in that a carrier level of the signal decreases and a level of a push-pull signal which is used as a tracking error signal also decreases in the case of the groove having the depth on the order of approximately ⅙ the wavelength.

On the other hand, it has been reported that the condition for reducing the crosstalk in the proposed method, that is, the setting of the depth of the groove of the magneto-optic recording medium, easily changes depending on the Kerr ellipticity, spherical aberration and focus error of the objective lens, and the like.

SUMMARY OF THE INVENTION

Accordingly, it is an object of the present invention to provide a novel and useful optical recording medium and optical information storage unit, in which the problems described above are eliminated.

Another and more specific object of the present invention is to provide an improved optical recording medium and optical information storage unit which can simultaneously reproduce a signal recorded on a land and a signal recorded on a groove of the optical recording medium so as to improve the transfer speed.

Still another object of the present invention is to provide an optical recording medium comprising an optically transparent substrate having a groove and a land which are formed spirally or concentrically, where the groove has an optical depth described by (⅛+(½)n)$\lambda$, where n is 0 or a positive integer and λ is a wavelength of a laser, and at least one of two walls defining the groove is zigzag shaped and the groove is capable of having digital information corded thereon. According to the optical recording medium of the present invention, it is possible to simultaneously reproduce information from the land and the groove.

A further object of the present invention is to provide an optical information storage unit comprising a first laser diode and a second laser diode irradiating laser beams on an optical recording medium, the optical recording medium comprising an optically transparent substrate having a groove and a land which have approximately the same width and are formed spirally or concentrically, the groove having an optical depth described by $(\frac{1}{8}+(\frac{1}{2})n)\lambda$, where n is 0 or a positive integer and λ is a wavelength of a laser, at least one of two walls of the groove being zigzag shaped and recording digital information, and the laser beams from the first and second laser diodes form first and second laser spots which irradiate mutually the adjacent groove and land, respectively. According to the optical information storage unit of the present invention, it is possible to simultaneously reproduce information from the land and the groove of the optical recording medium.

Other objects and further features of the present invention will be apparent from the following detailed description when read in conjunction with the accompanying drawings.

DETAILED DESCRIPTION OF THE PREFERRED EMBODIMENTS

Figure 1:
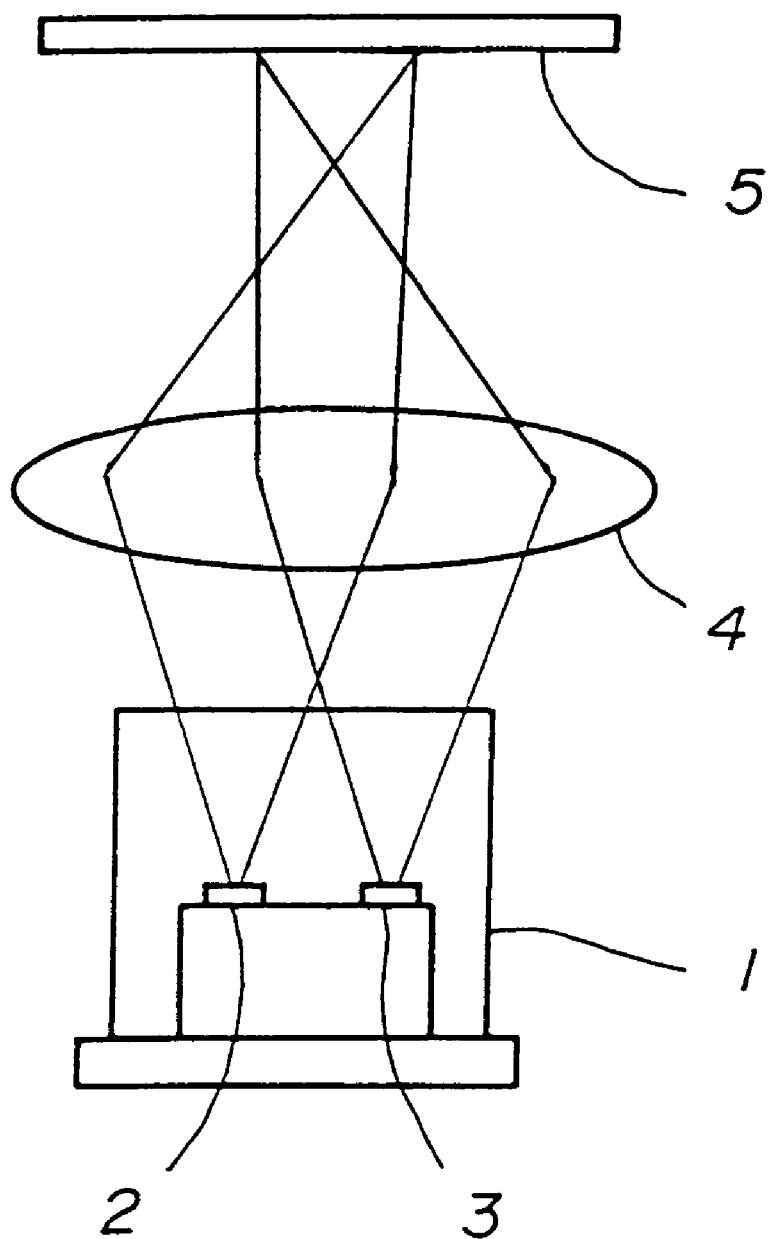
FIG. 1 is a diagram showing the general construction of an optical system of an embodiment of an optical information storage unit according to the present invention.

FIG. 1 is a diagram showing the general construction of an optical system of an embodiment of an optical information storage unit according to the present invention. The optical system shown in FIG. 1 irradiates a laser beam on an embodiment of a magneto-optic recording medium according to the present invention. Light beams emitted from semiconductor lasers 2 and 3 provided in a package 1 are converged to a diffraction limit by an objective lens 4 and are irradiated on a magneto-optic recording medium 5.

Figure 2:
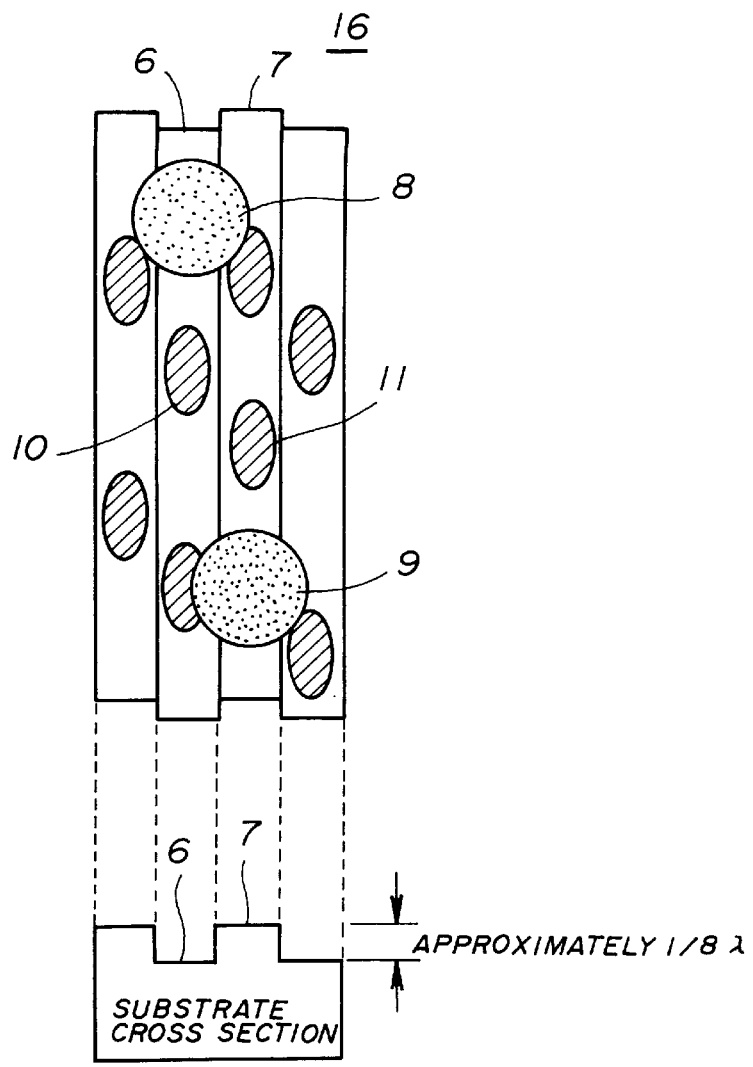
FIG. 2 is a plan view for explaining the positional relationship of laser spots and lands and grooves on an embodiment of a magneto-optic recording medium according to the present invention.

FIG. 2 is a plan view generally showing the positional relationship of laser spots on the magneto-optic recording medium. A laser spot 8 formed by the laser beam emitted from the semiconductor laser 3 and a laser spot 9 formed by the laser beam emitted from the semiconductor laser 2 irradiate a groove 6 and a land 7 of a magneto-optic recording medium 16, respectively. The groove 6 and the land 7 have approximately the same width, and an optical depth of the groove 6 is approximately $(\frac{1}{8}+(\frac{1}{2})n)\lambda$, where n is 0 or a positive integer and λ denotes the wavelength of the laser beams. By making the laser beam irradiate in this manner, the groove 6 records magnetic domains 10 by the semiconductor laser 3, and the land 7 records magnetic domains 11 by the semiconductor laser 2. In addition, the recorded magnetic domains 10 and 11 can be reproduced by the laser spot 8 and the laser spot 9, respectively. In other words, it is possible to simultaneously reproduce information from the groove 6 and the land 7. It is of course possible to use a push-pull signal from one of the laser spots 8 and 9 for the tracking control, but it is also possible to employ a differential push-pull (DPP) technique using a differential signal of the push-pull signals generated by the laser spots 8 and 9.

Figure 3:
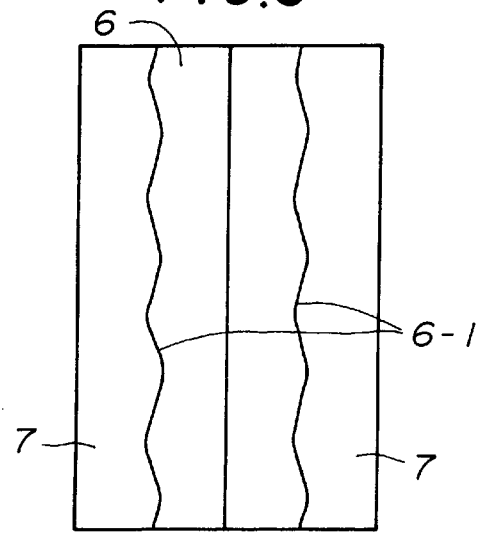
FIG. 3 is a plan view, on an enlarged scale, showing a part of the groove of the embodiment of the magneto-optic recording medium.

FIG. 3 is a plan view generally showing a part of the magneto-optic recording medium 16 on an enlarged scale, where zigzag shaped grooves are formed in only one of two walls 6-1 defining the groove 6 to record digital information such as address information and time information.

As shown in FIGS. 1 and 2, the semiconductor lasers 3 and 2 are exclusively provided for the groove 6 and the land 7, respectively. Hence, it is unnecessary to switch the polarity of a tracking error signal at the time of the recording and the reproduction. The information of the groove 6 is read by the laser spot 8 exclusively for the groove and the information of the land 7 is read by the laser spot 9 exclusively for the land, so that magneto-optic signals and the digital signals from the zigzag shaped grooves are read independently from the groove 6 and the land 7.

Figure 4:
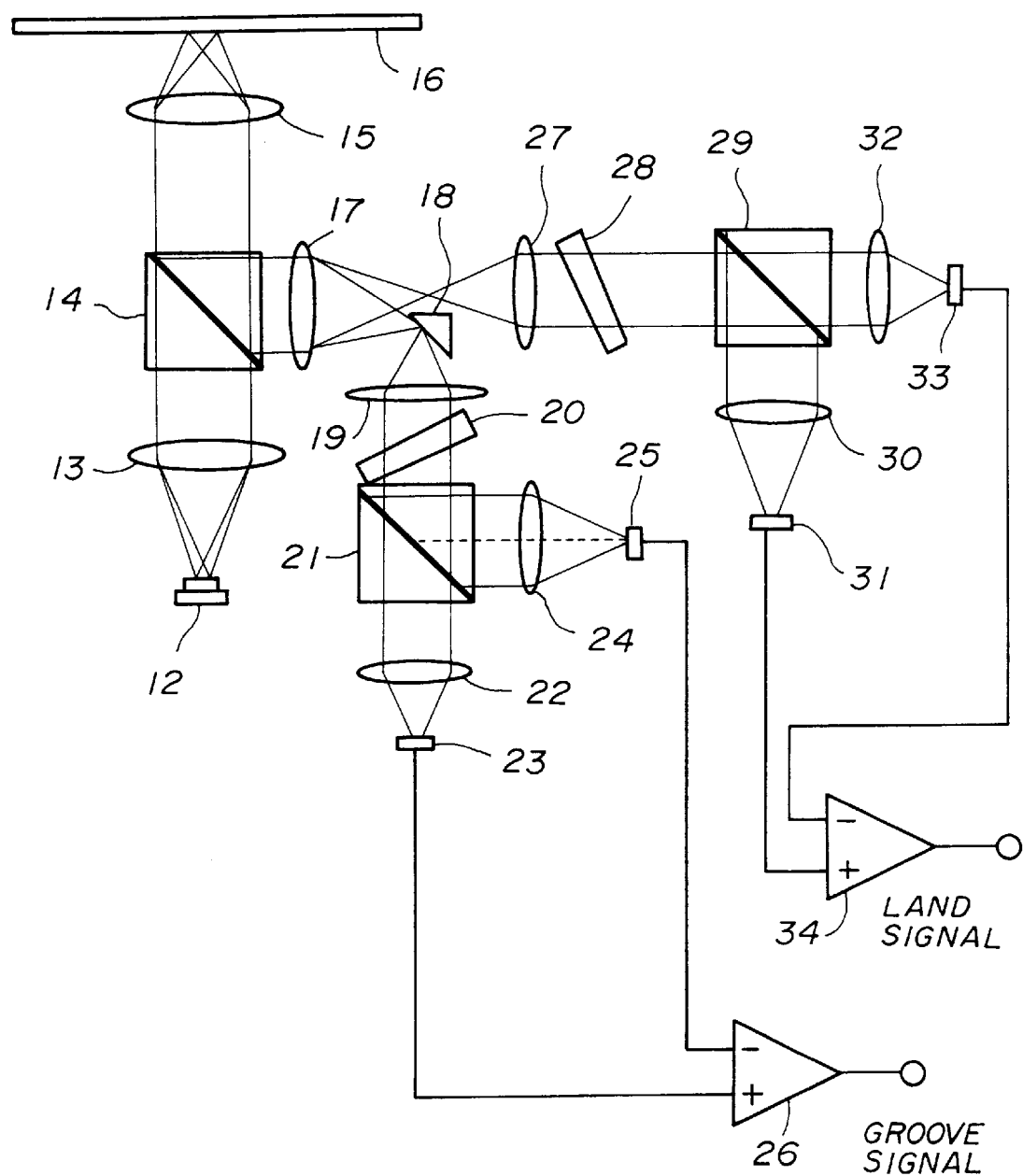
FIG. 4 is a diagram generally showing the embodiment of the optical information storage unit according to the present invention.

FIG. 4 shows the general construction of this embodiment of the optical information storage unit according to the present invention. The two laser beams emitted from the semiconductor lasers 2 and 3 shown in FIG. 1 which are accommodated within a package 12 are converted into parallel beams by a collimator lens 13, and is transmitted through a beam splitter 14. The light beams are further converged to a diffraction limit by an objective lens 15 and irradiated on the magneto-optic recording medium 16. The two irradiating light beams are arranged to form the laser spots 8 and 9 as shown in FIG. 2 by a tracking control using a push-pull signal of one of the two lights or the DPP technique using a differential signal of the push-pull signals generated from the two lights.

The two light beams reflected from the magneto-optic recording medium 16 pass through the objective lens 15 again, and are subjected to an amplitude separation by the beam splitter 14, whereby reflected components are converged to two positions by a convergent lens 17, and then the two light beams are separated into a transmitted component and a reflected component by a reflection prism 18 having only one surface which is a reflection surface. The reflected component is used to reproduce the information recorded on the groove 6, while the transmitted component is used to reproduce the information recorded on the land 7. The reflected component is converted into parallel light by a collimator lens 19 and is then transmitted through a ½ wave plate 20.

The ½ wave plate 20 is inclined by a certain angle with respect to a propagating direction of the light in order to eliminate a crosstalk signal from the land 7, and in addition, a crystal optical axis of the ½ wave plate 20 is arranged with a certain orientation angle with respect to an electrical vector of the light. The light transmitted through the ½ wave plate 20 is separated into a p-polarized light component and a s-polarized light component by a polarization beam splitter 21, and the p-polarized light component is converged on a photodiode 23 by a convergent lens 22. On the other hand, the s-polarized light component which is reflected by the polarization beam splitter 21 is similarly converged on a photodiode 25 by a convergent lens 24, so as to detect the signal from the groove 6. Furthermore, the signals corresponding to the light beams converged on the photodiodes 23 and 25 are detected as a final signal reproduced from the groove 6 by a differential amplifier 26.

Next, the component which is converged by the lens 17 and transmitted as is, is used to detect the information from the land 7. This component is converted into parallel light by a collimator lens 27, and is transmitted through a ½ wave plate 28. The ½ wave plate 28 is inclined by a certain angle with respect to a propagating direction of the light in order to eliminate a crosstalk signal from the groove 6, and in addition, a crystal optical axis of the ½ wave plate 28 is arranged with a certain orientation angle with respect to an electrical vector of the light. The inclination and orientation angle of the ½ wave plate 28 are different from those of the ½ wave plate 20.

The light transmitted through the ½ wave plate 28 is separated into a p-polarized light component and a s-polarized light component by a polarization beam splitter 29, and the p-polarized light component is converged on a photodiode 33 by a convergent lens 32, so as to detect the signal from the land 7. On the other hand, the s-polarized light component which is reflected by the polarization beam splitter 29 is similarly converged on a photodiode 31 by a convergent lens 30, so as to detect the signal from the land 7. Furthermore, the signals corresponding to the lights converged on the photodiodes 31 and 33 are detected as a final signal reproduced from the land 7 by a differential amplifier 34.

As described above, since the two semiconductor lasers 2 and 3 are independently used for the information recording and reproduction with respect to the land 7 and the groove 6, one semiconductor laser can be used for the information recording and reproduction with respect to the land 7 if the other semiconductor laser is used for the information recording and reproduction with respect to the groove 6. In addition, if a semitransparent mirror is used to separate a groove signal detected from the groove 6 and a land signal detected from the land 7, the light utilization efficiency deteriorates. But when a combination of a convergent lens and a prism having a reflection surface is used, it is possible to separate the two light beams without loss, and a signal detection of a high quality can be achieved.

Figure 5:
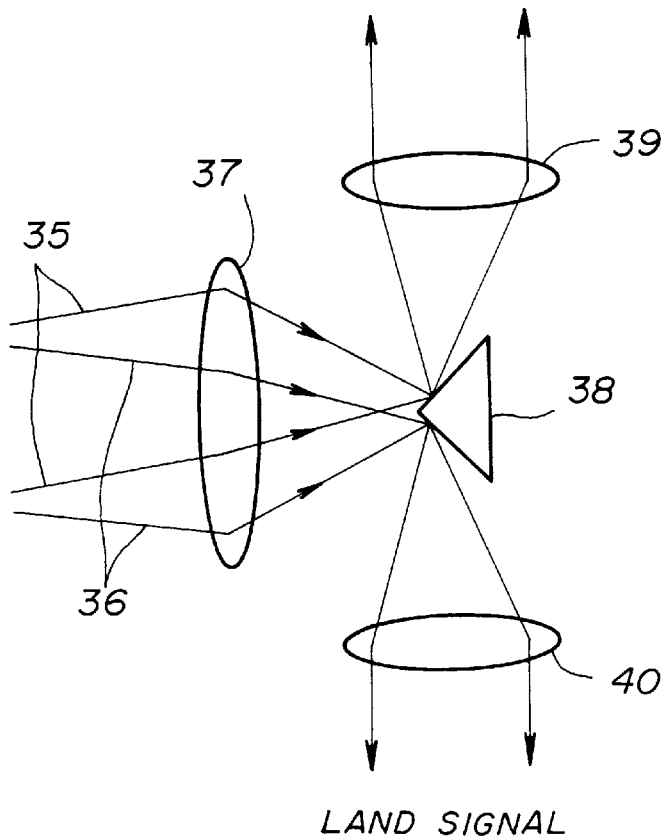
FIG. 5 is a diagram generally showing the construction of an optical system for separating a groove signal and a land signal.
Figure 6:
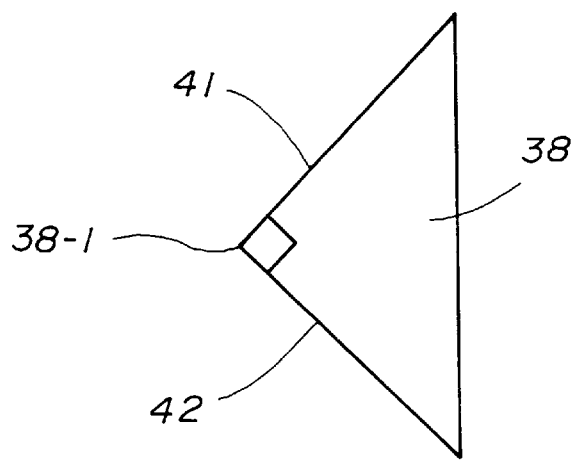
FIG. 6 is a diagram showing a prism which may be used in place of a reflection prism.

FIG. 5 shows a separating means for a case where a prism 38 having two mutually perpendicular reflection surfaces is used in place of the reflection prism 18 shown in FIG. 4. FIG. 6 shows an enlarged view of the prism 38 having two mutually perpendicular reflection surfaces. A light beam 35 for detecting the groove signal and a light beam 36 for detecting the land signal which are reflected by the magneto-optic recording medium 16 are converged by a convergent lens 37, and are reflected by reflection surfaces 41 and 42 of a prism 38, respectively, about an apex 38-1 of the prism 38. Hence, the two light beams 35 and 36 are completely separated and are converted into parallel light beams by convergent lenses 39 and 40, respectively. As described above in conjunction with FIG. 4, the parallel light beams are supplied to the optical information detecting optical systems respectively provided with respect to the groove 6 and the land 7, and it is thus possible to detect the information recorded on the land 7 and the groove 6 with a high quality.

Further, the two optical information detecting optical systems have phase compensation means for giving mutually different phase compensation quantities, and the phase compensation means may be formed by a crystal wave plate having refractive index anisotropy.

Figure 7:
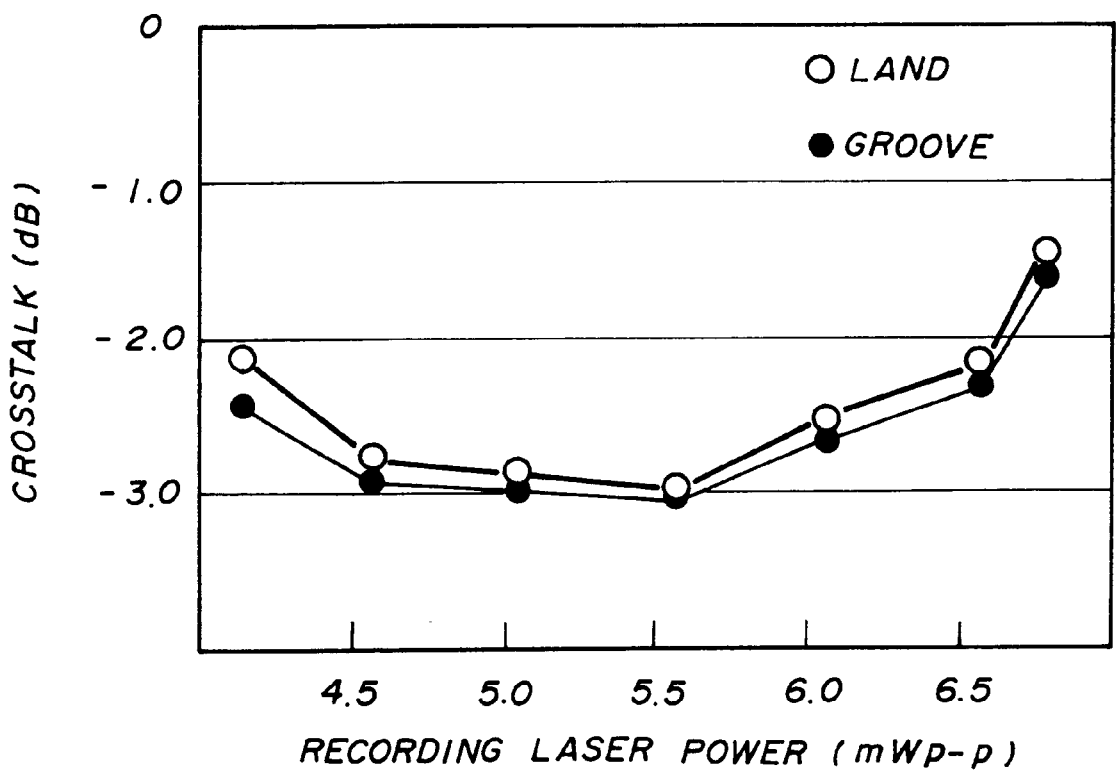
FIG. 7 is a diagram showing measured results of a recording laser power dependency of a crosstalk from an adjacent track.

FIG. 7 is a diagram showing measured results of a recording laser power dependency of a crosstalk from an adjacent track. The measured results shown in FIG. 7 were obtained in the following manner.

Magnetic domains, that is, marks having a length of 2 $\mu$m were recorded on the land 7 (or the groove 6) of the magneto-optic recording medium 16, and a carrier level Cm was measured. In addition, the groove 6 (or the land 7) which is adjacent to the above described land 7 (or the groove 6) was reproduced and a carrier level Camax was measured, and then a crosstalk Ct=Camax−Cm was obtained by denoting the higher carrier level by Camax. In FIG. 7, a white circular mark indicates the crosstalk from the land 7, and black circular mark indicates the crosstalk from the groove 6. The depth of the groove 6 in the magneto-optic recording medium 16 used was approximately ⅛ the wavelength, the pitch of the grooves 6 (or the lands 7) was 1.4 $\mu$m, and the recording layer had a 4-layer structure made up of SiN/TbFeCo/SiN/Al. The zigzag grooves of the groove 6 were formed only on one wall of the groove 6 as shown in FIG. 3.

The optical information storage unit used for reproduction used two semiconductor lasers respectively for the land 7 and the groove 6 with a wavelength of 680 nm, and was mounted with an objective lens having a numerical aperture of 0.55. A pulse assisted magnetic field modulation system was used as the recording method, and the recording mark length was 2.0 $\mu$m. The crosstalk by the signal recorded on the land 7 or the groove 6 was −25 dB or less for a large recording laser power range for both cases.

As described above in detail, independent semiconductor lasers are provided for the information recording and reproduction of the land and the groove. Using the semiconductor lasers provided exclusively for the information recording and reproduction of the land and the groove, respectively, the digital signal such as the address information and the time information recorded on the zigzag shaped grooves of the groove is reproduced independently by the two. Further, when reproducing the magneto-optic signals from the land and the groove, the signals are separated without loss, and the phase compensation conditions are optimized with respect to the land and the groove, by providing the two optical information detecting optical systems. Hence, the crosstalk caused by the signal from the adjacent groove or land does not fall within the optimum phase compensation conditions, and the signal amplitude of the crosstalk signal decreases. By this effect, the crosstalk from the land or the groove can be reduced by use of the magneto-optic recording medium and the optical information storage unit according to the present invention, and the simultaneous reproduction of the information from the land and the groove becomes possible. Therefore, the present invention is an extremely important technology for the high-density recording and reproduction.

Further, the present invention is not limited to these embodiments, but various variations and modifications may be made without departing from the scope of the present invention.

What is claimed is:

1. An optical recording medium comprising:

an optically transparent substrate having a groove, capable of having digital information recorded thereon, and a land which are formed spirally or concentrically, said groove having an optical depth described by $(1/8+(1/2)n) \lambda$, where n is zero or a positive integer and $\lambda$ is a wavelength of a laser, and wherein said groove is defined by two walls and further wherein at least one of said two walls is substantially zigzag shaped.

2. An optical information storage unit comprising:

a first laser diode and a second laser diode for irradiating laser beams on an optical recording medium, said optical recording medium including an optically transparent substrate having a groove, capable of having digital information recorded thereon, and a land which have approximately the same width and are formed spirally or concentrically, said groove having an optical depth described by $(1/8+(1/2)n) \lambda$, where n is zero or a positive integer and $\lambda$ is a wavelength of a laser, wherein said groove is defined by two walls and further wherein at least one of said two walls is substantially zigzag shaped, and the laser beams from the first and second laser diodes form first and second laser spots which irradiate a mutually adjacent groove and land, respectively.

3. The optical information storage unit as claimed in claim 2, wherein:

said first laser diode is used to record and/or reproduce information with respect to the land or the groove, and said second laser diode is used to record and/or reproduce information with respect to the groove or the land.

4. The optical information storage unit as claimed in claim 2, further comprising:

two optical information detecting optical systems, one for reproducing information from the groove and the other for reproducing information from the land, and each of the two optical information detecting optical systems having phase compensation means for giving different phase compensation quantities.

5. The optical information storage unit as claimed in claim 4, further comprising:

separating means for separating two laser beams which are emitted from the first and second laser diodes, irradiated on the optical recording medium and reflected by the optical recording medium.

6. The optical information storage unit as claimed in claim 5, wherein:

said separating means comprises a convergent lens and a reflection prism.

7. The optical information storage unit as claimed in claim 4, wherein:

said phase compensation means comprises a crystal wave plate having refractive index anisotropy.

8. The optical information storage unit as claimed in claim 7, wherein:

said crystal wave plate is made up of a ½ wave plate, and ½ wave plates arranged in said two optical information detecting optical systems have different inclinations with respect to propagating directions of corresponding laser beams, and have different crystal optical axis orientations with respect to electrical vector directions of the corresponding laser beams respectively incident to the ½ wave plates.

* * * * *